US007568000B2

(12) United States Patent
Keyes et al.

(10) Patent No.: US 7,568,000 B2
(45) Date of Patent: Jul. 28, 2009

(54) SHARED-USE DATA PROCESSING FOR PROCESS CONTROL SYSTEMS

(75) Inventors: Marion A. Keyes, St. Louis, MO (US); Rahul Deshmukh, St. Louis, MO (US); Gary G. Cacciatore, Santa Ana, CA (US); Stephen J. Staphanos, Long Beach, CA (US); James Patrick Kennedy, Incline Village, NV (US)

(73) Assignee: Rosemount Analytical, Anaheim, CA (US)

( * ) Notice: Subject to any disclaimer, the term of this patent is extended or adjusted under 35 U.S.C. 154(b) by 620 days.

(21) Appl. No.: 09/934,036

(22) Filed: Aug. 21, 2001

(65) Prior Publication Data

US 2003/0041135 A1    Feb. 27, 2003

(51) Int. Cl.
*G06F 15/173* (2006.01)
(52) U.S. Cl. .......................... 709/200; 705/7
(58) Field of Classification Search .......... 709/203, 709/223, 230; 702/188, 185, 182; 700/108, 700/174, 175, 266; 705/7
See application file for complete search history.

(56) References Cited

U.S. PATENT DOCUMENTS

| | | | |
|---|---|---|---|
| 5,134,574 A | 7/1992 | Beaverstock et al. ... | 364/551.01 |
| 5,301,101 A | 4/1994 | MacArthur et al. ......... | 364/156 |
| 5,333,298 A | 7/1994 | Bland et al. ................. | 395/500 |
| 5,386,373 A * | 1/1995 | Keeler et al. ............... | 700/266 |
| 5,546,301 A | 8/1996 | Agrawal et al. ............ | 364/140 |
| 5,666,297 A | 9/1997 | Britt et al. .................. | 364/578 |
| 5,748,470 A | 5/1998 | Hager, III et al. .......... | 364/187 |
| 5,784,570 A * | 7/1998 | Funkhouser ................ | 709/247 |
| 5,798,939 A | 8/1998 | Ochoa et al. ............... | 364/493 |
| 5,805,442 A | 9/1998 | Crater et al. ............... | 364/138 |
| 5,819,232 A | 10/1998 | Shipman ........................ | 705/8 |

(Continued)

FOREIGN PATENT DOCUMENTS

GB    2 347 234 A    8/2000

(Continued)

OTHER PUBLICATIONS

International Search Report for PCT/US02/25783, issued Nov. 13, 2002.

(Continued)

*Primary Examiner*—Andrew Caldwell
*Assistant Examiner*—Benjamin Ailes
(74) *Attorney, Agent, or Firm*—Marshall, Gerstein & Borun LLP (57) ABSTRACT

A data processing system and method for use with a process control system enables a plurality of process plants associated with different business entities to share a remotely situated data processing facility. The data processing facility includes a cluster of redundant servers that are communicatively coupled via a local network. Each of the redundant servers is adapted to acquire and process data received from the plurality of process plants. The data processing facility also includes a plurality of redundant data historians that are communicatively coupled to each other and to the cluster of redundant servers for storage of process data and analysis results. Each of the plurality of process plants includes internet-enabled field devices, internet-enabled field device interfaces, and/or internet-enabled data concentration nodes that send information to and receive information from the data processing facility via the Internet.

40 Claims, 2 Drawing Sheets

U.S. PATENT DOCUMENTS

| | | | |
|---|---|---|---|
| 5,832,423 A * | 11/1998 | Hochart | 702/188 |
| 5,862,054 A | 1/1999 | Li | 364/468.28 |
| 5,975,737 A | 11/1999 | Crater et al. | 364/138 |
| 6,041,263 A | 3/2000 | Boston et al. | 700/32 |
| 6,055,483 A | 4/2000 | Lu | 702/31 |
| 6,061,603 A | 5/2000 | Papadopoulos et al. | 700/83 |
| 6,094,600 A | 7/2000 | Sharpe, Jr. et al. | 700/19 |
| 6,108,616 A | 8/2000 | Borchers et al. | 702/183 |
| 6,110,214 A | 8/2000 | Klimasauskas | 703/2 |
| 6,122,555 A | 9/2000 | Lu | 700/9 |
| 6,285,966 B1 * | 9/2001 | Brown et al. | 702/188 |
| 6,298,377 B1 | 10/2001 | Hartikainen et al. | 709/223 |
| 6,317,701 B1 | 11/2001 | Pyötsiä et al. | 702/188 |
| 6,332,110 B1 | 12/2001 | Wolfe | 702/22 |
| 6,421,571 B1 | 7/2002 | Spriggs et al. | |
| 6,505,145 B1 * | 1/2003 | Bjornson | 702/185 |
| 6,633,782 B1 * | 10/2003 | Schleiss et al. | 700/26 |
| 6,633,823 B2 * | 10/2003 | Bartone et al. | 702/57 |
| 6,774,786 B1 * | 8/2004 | Havekost et al. | 340/517 |
| 6,795,798 B2 * | 9/2004 | Eryurek et al. | 702/188 |
| 6,813,532 B2 * | 11/2004 | Eryurek et al. | 700/108 |
| 6,813,587 B2 * | 11/2004 | McIntyre et al. | 702/183 |
| 6,907,320 B2 * | 6/2005 | Nagafuchi et al. | 700/292 |
| 6,934,663 B2 * | 8/2005 | Bjornson | 702/185 |
| 6,999,903 B2 * | 2/2006 | Ikeda et al. | 702/188 |
| 7,120,558 B2 * | 10/2006 | McIntyre et al. | 702/183 |
| 7,162,391 B2 * | 1/2007 | Knepler et al. | 702/182 |
| 7,496,429 B2 * | 2/2009 | Nagafuchi et al. | 700/292 |
| 2002/0161624 A1 * | 10/2002 | Bradlee | 705/10 |
| 2004/0024891 A1 * | 2/2004 | Agrusa et al. | 709/230 |
| 2007/0011295 A1 * | 1/2007 | Hansen | 709/223 |

FOREIGN PATENT DOCUMENTS

| | | |
|---|---|---|
| GB | 2 355 092 A | 4/2001 |
| JP | 09-200262 | 7/1997 |
| JP | 10-260821 | 9/1998 |
| JP | 2000-067015 | 3/2000 |
| JP | 2000-112518 | 4/2000 |
| WO | WO 00/04427 | 1/2000 |
| WO | WO 00/04427 A | 1/2000 |
| WO | WO 00/23857 | 4/2000 |
| WO | WO 00/31597 | 6/2000 |
| WO | WO 00/77584 A1 | 12/2000 |
| WO | WO 01/01321 A1 | 1/2001 |
| WO | WO 01/31539 A1 | 5/2001 |

OTHER PUBLICATIONS

International Preliminary Examination Report for PCT/US02/25783, mailed Jul. 24, 2003.
Written Opinion for PCT/US02/25783, mailed Mar. 20, 2003.
Translation of Decision to Dismiss the Amendment, dated Sep. 11, 2008, Patent Application No. JP 2003-523310.

* cited by examiner

SHARED-USE DATA PROCESSING FOR PROCESS CONTROL SYSTEMS

FIELD OF THE INVENTION

The present invention relates generally to process control systems within process plants and, more particularly, to a data processing facility that uses internet-based communications to provide data processing and control facilities to a plurality of process plants.

DESCRIPTION OF THE RELATED ART

Process control systems, like those used in chemical, petroleum or other process plants, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The increasing number and size of power generating plants, industrial process plants, fossil-fueled heating ventilation and air-conditioning (HVAC) systems, appliances, etc. has seriously challenged the environment and has increased the importance of monitoring and analyzing the measurements made within residential, commercial and industrial process control systems. As a result, increased competition and legal pressures such as, for example, increased environmental regulation, have caused environmental compliance and pollutant minimization, environmental safety, plant safety and improved energy efficiency of the process control activities within a plant to become a significant source of profit improvement for process plant owners. Of course, profit improvement also includes the avoidance of fines, lawsuits and other costs that may be associated with the failure to comply with environmental legislation, agency rules, safety regulations, etc.

One particularly important regulatory area involves legislation designed to limit harmful emissions from process plants. The trend associated with such emissions legislation has been to require the monitoring and control of a broader range of chemical species and other environmental parameters such as, for example, emission opacity, particulate density, turbidity and micro-organism presence, type and concentration. In addition, regulatory authorities have recently drafted environmental legislation imposing a higher degree of accountability for plant owners and/or managers by requiring more detailed and more frequent reporting of emissions data.

In addition to the increased importance of environmental issues and plant efficiency issues, the importance of feed stream, intermediate stream and final product composition and quality have also become crucial issues for plant operators and owners. For example, regulations affecting the production of pharmaceutical products, biotechnology products, food products, beverage products and any other products for which product composition and quality may affect human health and safety are subject to increasing levels of governmental control and scrutiny. See, for example, 21 CFR 11. As is generally understood, the production of products that may affect human health and safety typically requires accurate process measurement and control as well as a production record suitable for auditing. A production record suitable for auditing usually includes a complete production history (i.e., detailed information concerning the conditions surrounding the production of each production item), sign-offs by authorized manufacturing and quality personnel, and verification, validation and reconciliation of all critical process parameters.

While a variety of data analysis tools such as optimization software, maintenance software, and a variety of other well known asset management methods, tools or software, such as those described in U.S. patent application Ser. No. 09/852,945 entitled "Remote Analysis of Process Control Plant Data" filed on May 10, 2001, which is hereby incorporated herein in its entirety, are widely used within process control plants, supporting such methods, tools and software often results in substantial costs to the plant owner. Ideally, however, the substantial costs associated with the purchase and maintenance of such asset management tools and software are more than offset by efficiency-based cost reductions, which are a direct result of using such tools and software. As is well known, these efficiency-based cost reductions are a result of the fact that the efficient operation of a plant depends strongly on the condition of the equipment within the plant and the timing of maintenance on that equipment.

Traditionally, equipment performance monitoring tools such as, for example, input/output algorithms, models, etc. have been used to determine how efficiently a plant is running and/or whether a more cost effective process can be achieved through changes in maintenance procedures, replacement of worn equipment, modification of equipment, etc. Unfortunately, equipment performance monitoring requires significant expenditures for hardware and software (e.g., data analysis tools) and also typically requires skilled technicians and other specialists to support and oversee daily performance monitoring activities. Many plant owners and operators have recognized that the high costs associated with equipment performance monitoring activities have become an important area for competitive cost reductions, particularly in the case of smaller plant operations for which economies of scale dictate greater focus on core competencies.

Custom analytical instrumentation provides one well known manner of measuring and optimizing critical process parameters. Unfortunately, such well-known custom analytical instrumentation is relatively costly and typically requires expensive proprietary communication networks and interfaces. The high costs associated with such custom analytical instrumentation are compounded by the fact that the proprietary nature of the communication links between the analytical instrumentation and the devices within the process control plant requires each process plant to have a complete set of analytical instrumentation. In other words, with conventional analytical instrumentation and data analysis techniques, it is not possible to share analytical instrumentation resources between physically separate or remote plants much less between plants owned and operated by different business entities. Thus, relatively small process plants typically cannot justify the substantial investment required to implement custom analytical instrumentation or systems and, as a result, cannot realize the operational efficiency improvements and other benefits provided by these systems.

While a typical process control system has many process control and instrumentation devices, such as valves, transmitters, sensors, etc. connected to one or more process controllers, which execute software that controls these devices during the operation of the process, there are many other supporting devices that are also necessary for or related to process operation. These additional devices include, for example, power supply equipment, power generation and distribution equipment, rotating equipment such as turbines, etc., all of which are typically distributed throughout a plant. While this additional equipment does not necessarily create or use process variables and in many instances is not controlled or even coupled to a process controller for the purpose of affecting the process operation, this equipment is nevertheless important to and is ultimately necessary for proper operation of the process.

Persons responsible for applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions. Unfortunately, the proprietary nature of the communication links that are typically used with conventional analytical instrumentation systems makes it difficult, if not impossible, for an authorized user to access important process control data from a remote location. More specifically, for the remote user to communicate with analytical instrumentation systems, the user must typically employ a computer platform having its own copies of the software needed to communicate using the proprietary communication protocol of the instrumentation and process control system of a particular process plant.

SUMMARY OF THE INVENTION

In accordance with one aspect of the invention, a data processing system for use with a process control system includes a first processing plant communicatively coupled to an open network and a second processing plant communicatively coupled to the open network. The data processing system may further include a primary server communicatively coupled to the open network that may be adapted to execute a data processing application, and a primary data historian may be communicatively coupled to the primary server. The primary server may be adapted to receive process control information from the first and second processing plants via the open network and to store a portion of the received process control information in the primary data historian. Additionally, the primary server may be further adapted to use the data processing application to generate analysis results and send the analysis results to the first and second plants via the open network.

In accordance with another aspect of the invention, a data processing system for use with a process control system includes a cluster of redundant servers that are communicatively coupled via local network. Each of the redundant servers may be adapted to acquire and process data. The data processing system may also include a plurality of redundant data historians that are communicatively coupled to each other and to the cluster of redundant servers. Additionally, the data processing system may further include a plurality of process plants that are communicatively coupled to the cluster of redundant servers via an internet. The plurality of process plants may be associated with a plurality of business entities, and the cluster of redundant servers may be adapted to execute a data processing application that processes information received from the plurality of process plants and that generates analysis results which are accessible by a user via the internet In accordance with yet another aspect of the invention, a method of acquiring, analyzing and reporting process plant data includes the steps of receiving information from a plurality of process plants associated with a plurality of business entities via an internet and processing the received information using a cluster of redundant servers associated with a vendor business entity that is different from the plurality of business entities to generate analysis results. The method may also include the steps of storing the analysis results in a plurality of redundant data historians that are communicatively coupled to the cluster of redundant servers, providing access to the analysis via the internet and billing each of the plurality of business entities based on one of respective data usage and type and processing time.

DESCRIPTION OF THE PREFERRED EMBODIMENTS

Figure 1:
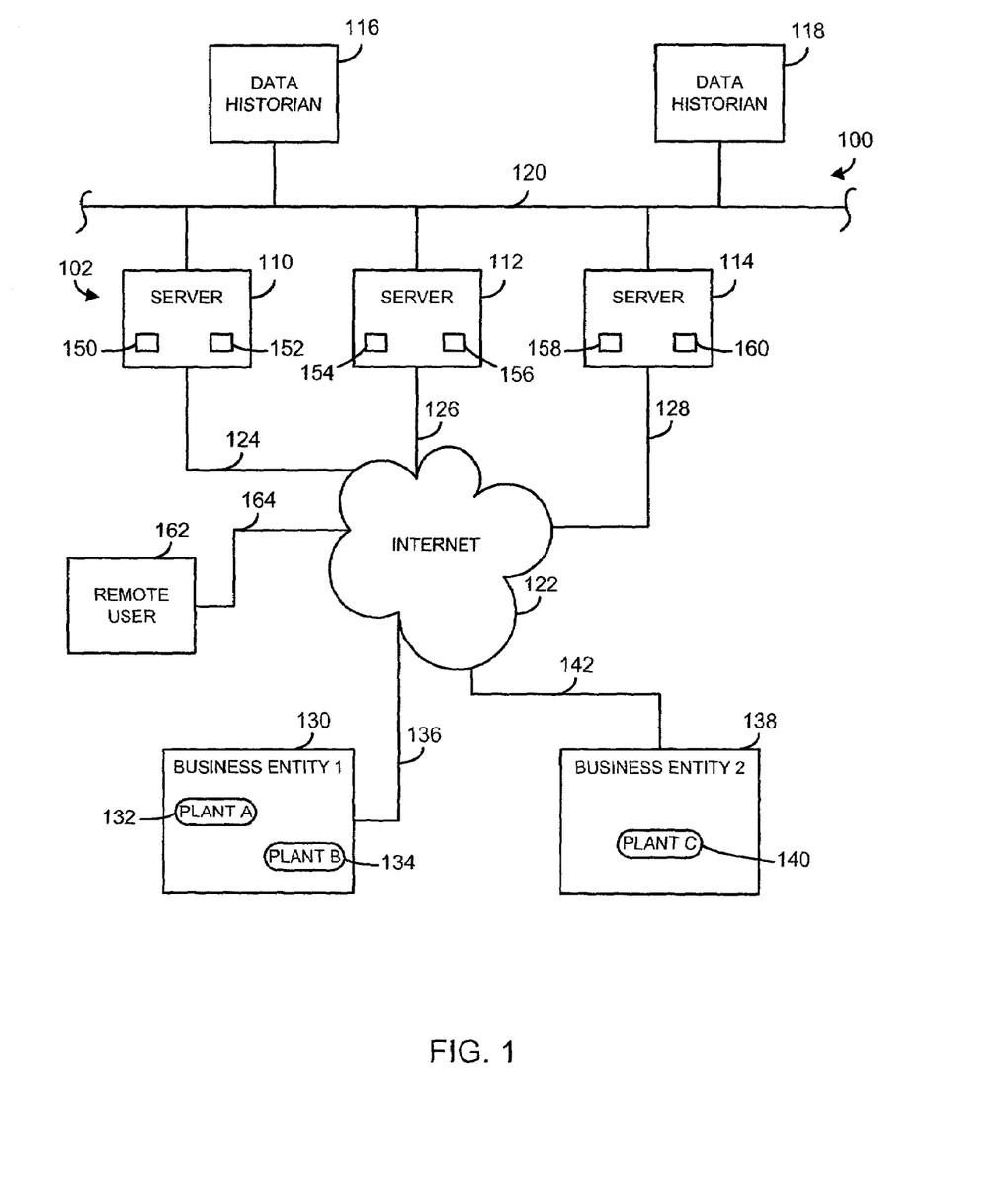
FIG. 1 is an exemplary schematic block diagram of shared-use data processing facility that uses the Internet to communicate with process control plants associated with a plurality of different business entities.

FIG. 1 is a schematic block diagram of a shared-use data processing facility 100 that may use internet-based communications to provide data processing and control facilities to a plurality of remotely situated process plants. Generally speaking, the shared-use data processing facility described herein may communicate with one or more process plants that are physically remote from each other and from the data processing facility. As described in greater detail below, the shared-use data processing facility 100 may utilize the Internet to enable multiple process plants, each of which may be owned by multiple and/or different business entities, to analyze, to process and to manage process information or data, as well as to prepare reports and to respond to ad hoc information requests from plant managers, operators or any other authorized users.

Generally speaking, the process plants in communication with the shared-use data processing facility 100 may be owned and operated by a single business entity or, alternatively, single or groups of the process plants may be owned and operated by different multiple business entities. In any event, each of the process plants may send and receive data or information via the Internet to the shared-use data processing facility described herein. The shared-use data processing facility may provide a variety of optimization tools, control tools, diagnostic tools, etc. that may be useful in improving and/or enhancing the operation of the process plants. In this manner, the relatively high costs associated with hardware and software, as well as the maintenance thereof, of the data processing facility described herein may be shared among a plurality of physically separate plants and, if desired, among a plurality of business entities, each of which may be operating one or more plants in physically remote locations. Thus, in contrast to prior systems, which required that each physical plant have its own data analysis tools (e.g., optimizer tools, diagnostic tools, etc.), a relatively small process plant may be able to cost effectively realize the benefits of having access to such tools.

Additionally, the ubiquitous nature of the Internet greatly simplifies the manner in which remote users, operators, technicians, etc. may interface with a particular plant, data analysis tool, device, etc. For example, in contrast to conventional process control data analysis techniques and systems that typically require special (possibly custom) software and sometimes hardware to communicate with a plant that uses a proprietary communication protocol, the shared-use data processing facility described herein enables remote users or operators to access plant information, control plant operations, etc. using conventional internet browser software that is being executed on virtually any workstation, portable computer, etc. Furthermore, because the shared-use data processing facility described enables a user to interface with the data analysis tools and plants using conventional internet browser software as a visualization layer, the full-featured graphical interface capabilities of well-developed internet browser software can be leverage to enhance the functionality of the user's remote interface sessions. For example, as is well known, internet browser software typically provides applets that may be used to view information in real time. Thus, if desired, the shared-use data analysis facility described herein may use applets within one or more web pages that enable a user to view process control data from a particular plant in real-time. Additionally, the internet browser software may, if desired, provide flexible display and log formatting capability that allows plant operators, managers or any other user to customize how they would like to see process information presented.

As shown in FIG. 1, the shared-use data analysis facility 100 includes a redundant server cluster 102, which includes a plurality of redundant servers 110, 112 and 114, and a plurality of data historians 116 and 118, all of which are communicatively coupled via a data bus 120. The data bus 120 may an Ethernet-based local area network (LAN) or any other suitable data bus. The redundant servers 110-114 may also be communicatively coupled to the Internet 122 via respective communication links 124, 126 and 128. The communication links 124-128 may be any suitable hardwired link such as, for example, a telephone line, or any suitable wireless link such as, for example, a satellite or cellular phone link. As is also shown in FIG. 1, a first business entity 130 having first and second process plants 132 and 134 may use a communication link 136 that enables communications between its plants 132 and 134 and the redundant servers 110-114 via the Internet 122. As with the communication links 124-128, the communication link 136 may be any suitable hardwired or wireless link. Similarly, a second business entity 138 may include a third process plant 140 that uses a communication link 142 to communicatively couple the third process plant to the redundant servers 110-114 via the Internet 122.

Generally speaking, the redundant servers 110-114 may function as a cluster of redundant servers that are responsible for the acquisition, processing, marshaling, archiving and reporting (e.g., presentation) of analytical and real-time process data. More specifically, each of the servers 110, 112 and 114 may include one or more respective applications (i.e., software) 150-160 that may execute complex calculations and which may carry out change management for a process and/or plant. By way of example only, the applications 150-160 may include data analysis tools, remote process management tools, process optimization tools, continuous emissions monitoring and minimization tools, distributed power management tools, dispatch and optimization tools, centralized multi-client HVAC system monitoring and maintenance management tools, remote water and waste processing facility monitoring and control tools, pharmaceutical and biotechnology process, data management and control tools, semiconductor process control and data management tools, or any other desired software tools that may be used to enhance or improve the operation and/or interface to a process plant. Still further, the redundant cluster of servers 110-114 may be used to validate data prior to presentation (i.e., display) of that data to a user and may provide a relatively high degree of process management and reporting capability. Additionally, the redundant cluster of servers 110-114 may store and/or have access to properties (e.g., steam tables, chemical tables, etc.) and methods (e.g., applications that may be customized for a particular user). Of course, while three servers are shown in FIG. 1, more or fewer servers may be used instead without departing from the scope and the spirit of the invention.

The redundant servers 110-114 may send and receive historical process control data to and from the data historians 116 and 118 via the data bus 120. In this manner, the shared-use data processing facility 100 may organize and store or archive, in non-volatile memory, if needed, process control data, analysis results, reports, or any other information pertaining to the operation of a plant, process, etc. One of the redundant servers 110-114 may function a primary server, while the other servers may be continuously synchronized with the primary server and function as backup servers. Such a backup function may be carried out by enabling one or more of the servers 110-114 to continuously monitor the health and performance of the primary server. If failure or performance degradation of the primary server is detected or anticipated, one or more of the backup servers may take over data processing, analysis, etc. and supersede the operation of the failed or failing primary server. Importantly, the business entities 130 and 138 may be able archive significant amount of process data, analysis results, etc. within the data processing facility 100, thereby enabling the secure, remote storage of potentially important process information and facilitating any future audit (e.g., by a regulatory agency) of that important process information. The design and operation of data historians are well known in the art and, thus, will not be described further herein. Although two redundant data historians 116 and 118 are shown in FIG. 1, more or fewer redundant data historians could be used, if desired.

Because the shared-use data processing facility 100 exchanges data, information, etc. with the business entities 130 and 138 via the Internet 122, a remote user 162, if authorized, may access process control data, analysis data, diagnostic data, or any other information or data generated by the plants 132, 134 and 140 and the shared-use data processing facility 100 using a portable computer, laptop computer, remote workstation, or any other suitable computer platform that is communicatively coupled to the Internet via a communication link 164. The communication link 164 may be any suitable hardwired or wireless link that enables a computer to exchange digital information using well known internet protocols. As noted above, the remote user 162 does not have to employ a computer or other processing station having executable copies of expensive communications software that enables the remote computer to communicate with the proprietary communication protocols, which are typically associated with conventional analytical measurement systems and process control systems. Instead, the remote user 162 may interface with the shared-use data processing facility 100 using a conventional internet browser, which typically provides a full-featured graphical interface.

Figure 2:
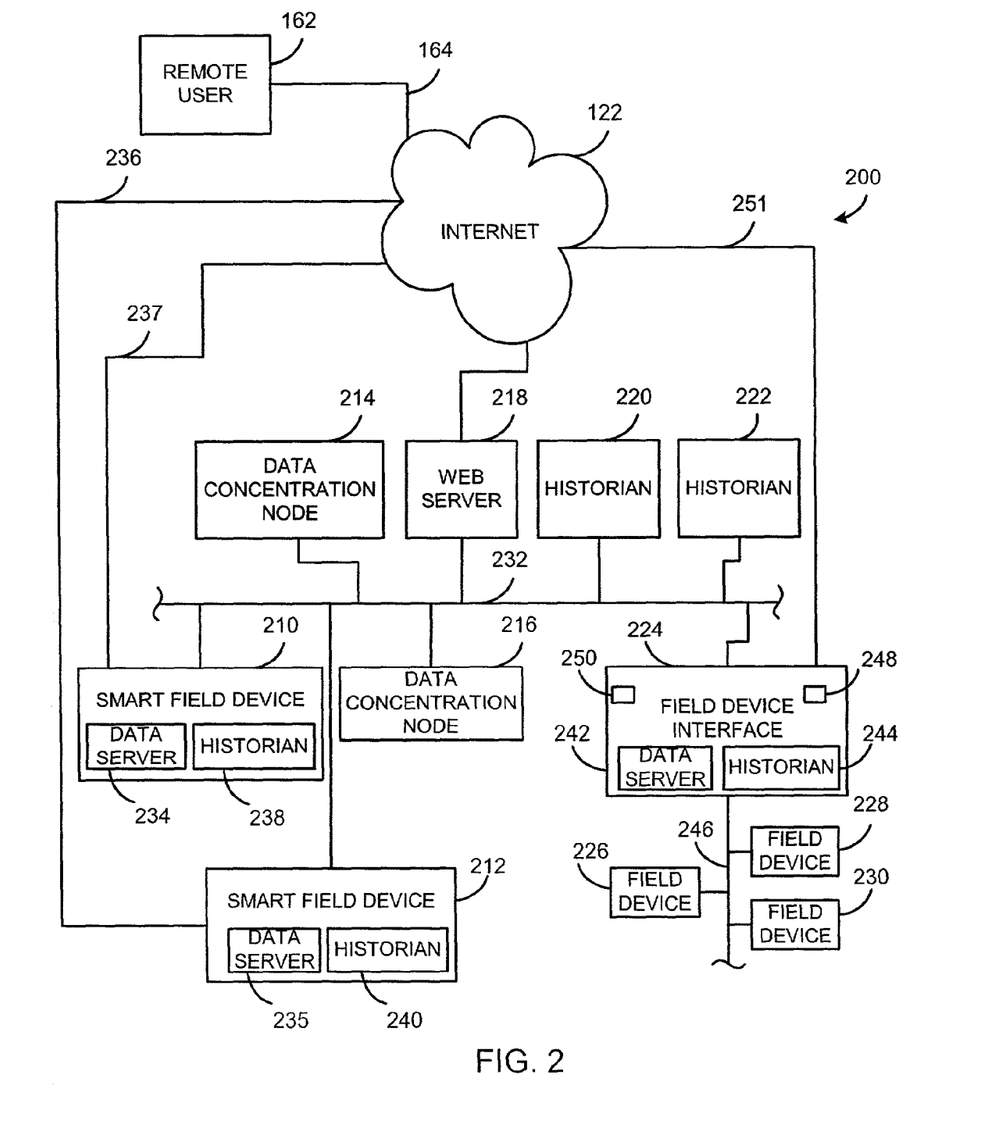
FIG. 2 is an exemplary schematic block diagram that depicts one manner in which a process control plant process control system may be configured to interface with the shared-use data processing facility shown in FIG. 1.

FIG. 2 is a more detailed schematic block diagram that depicts the manner in which a plant process control system 200 may be configured to communicate via the Internet 122 with the shared-use data processing facility 100 shown in FIG. 1. As shown in FIG. 2, the process control system 200 may include a plurality of internet-enabled smart field devices 210 and 212, redundant data concentration nodes 214 and 216, a web server 218, redundant data historians 220 and 222 and a field device interface 224, which may be connected to a plurality of conventional field devices 226, 228 and 230, all of which may be communicatively coupled within a local area network via a data bus 232. The data bus 232 may be an Ethernet-based data bus, or any other suitable data bus based on, for example, RS485 Modbus, Foundation Fieldbus, blue tooth, or generally any other communication protocol that uses a wire-based, wireless, fiber optic, etc., physical communication medium.

The internet-enabled smart field devices 210 and 212 may include respective embedded data servers 234 and 235 that enable the smart field devices 210 and 212 to communicate via the Internet 122 over communication links 236 and 237 using any desired internet protocol such as, for example, transport control protocol internet protocol (TCP/IP). The embedded data servers 234 and 235 enable the smart field devices 210 and 212 to send and receive measurement information, sensor status information, control information, or any other process information to and from the shared-use data processing facility 100 (FIG. 1). The smart field devices 210 and 212 may be any desired devices or systems that are adapted for use within a process control system such as, for example, temperature sensors, pressure sensors, level sensors, volumetric flow sensors, mass flow sensors, position sensors, speed sensors, heat transfer coefficient sensors, limit switches and other on/off sensors and control devices, as well as condition sensors for process equipment diagnostics such as vibration and acceleration monitors. The internet-enabled smart field devices 210 and 212 facilitate remote access (e.g., a remote user in communication with the shared-use data processing facility 100) and/or local access (e.g., a user at an operator's terminal within a plant). Additionally, the internet-enabled smart field devices provide remote and/or local access to diagnostic information, enable users to set configuration parameters, and provide access to device maintenance and calibration history some or all of which may be organized and stored within the redundant data historians 116 and 118.

The internet-enabled smart field devices 210 and 212 may also include respective embedded data historians 238 and 240 that may be used to organize and archive data, analysis results, etc. within the smart filed devices 210 and 212. The data historians 238 and 240 may be used in well known manners to maintain to prevent the loss of critical data in the event communications are interrupted.

Similarly, the internet-enabled field device interface 224 also includes an embedded data server 242 and an embedded data historian 244. The internet-enabled field device interface 224 may communicate with the field devices 226-230 via a data bus 246, in which case, the field devices 226-230 are smart field devices such as, for example, Foundation Fieldbus devices that communicate using the Foundation™ Fieldbus communication protocol. Additionally, the internet-enabled field device interface 224 may include a controller 248, such as, for example, a DeltaV™ controller sold by Fisher-Rosemount Systems, Inc. of Austin, Tex., or any other suitable controller. Additionally, the internet-enabled field device interface 224 may include an input/output (I/O) device 250 that enables communications between the controller 248 and the field devices 226-230. Of course, other types of smart or non-smart field devices could be used instead of or in addition to Fieldbus devices. For example, highway addressable remote transmitter (HART) devices may be used. Furthermore, other communication protocols may be used for the data bus 246. For example, field devices using any of the PROFIBUS®, WORLDFIP®, Device-Net®, AS-Interface and CAN protocols could be used instead of or in addition to Fieldbus devices. Thus, the internet-enabled field device interface 224 enables a plurality of smart and/or non-smart field devices to communicate over the Internet 122 with the shared-use data processing facility described herein via a communication link 251, without requiring the field devices 226-230 to have internet-enabled embedded data servers or embedded historians as are used with the internet-enabled smart field devices 210 and 212. Alternatively, the internet-enabled field device 224 may be based on a lower functionality platform such as, for example, a remote terminal unit (RTU), which is a well known control system platform.

The redundant data concentration nodes 214 and 216 reside at a higher level of the plant or process control system 200 hierarchy and may collect process control data and other process information from the internet-enabled smart field devices 210 and 212, the internet-enabled field device interface 224 and any other devices or systems via the system data bus 232. At least one of the data concentration nodes 214 and 216 may be configured to act as a primary device while another one of the concentration nodes may be configured to function as a backup or redundant device. In that case, the primary one of the concentration nodes 214 and 216 may send and receive (i.e., marshal) information to the shared-use data processing facility described herein via the system level data bus 232 and the web server 218. Additionally, the redundant data historians 220 and 222 may be used to organize and archive process control data, diagnostic data, or any other information or data pertaining to the process control system 200.

The data servers used in connection with the shared-use data processing facility described herein may use any desired data compression technique to minimize bandwidth consumption without sacrificing data content or accuracy. Additionally or alternatively, the embedded data servers 234, 235 and 242 used within the internet-enabled smart field devices 210 and 212, the internet-enabled field device interface 224 and/or the web server 218 may use data compression to minimize bandwidth consumption. By way of example only, data compression techniques may be accomplished using well known techniques such as exception transmission (i.e., insignificant data changes are not transmitted), Fourier or wavelet transmission, which transmits frequency domain coefficients that are reconstituted into the original real-time signal by the receiving device, etc. Of course, any other known or later developed data compression techniques could be used instead without departing from the scope and spirit of the invention.

The shared-use data processing facility described herein may employ various data correction techniques to correct for sensor drift (i.e., degradation of sensor accuracy over time) and sensor failure. The redundant data servers 110-114 within the shared-use data processing facility 100 may execute applications that provide automatic digital verification, data validation, data reconciliation and periodic or event triggered automatic data source re-calibration (for sensors or other devices having this capability). Further, the data correction applications being executed by the shared-use data processing facility 100 may include failure and drift detection circuitry and/or logic that identifies when a sensor or device has drifted (or is about to drift) beyond its self-correction range. In response to detecting such an out-of-range condition, the failure and drift detection circuitry and/or logic may execute a bumpless measurement substitution, which sends the last known good measurement from the failing sensor or device to a redundant sensor or device, and may then generate and alarm message for the failed or failing device. Of course, more complex data correction or substitution schemes such as, for example, neural net or correlation model may be used instead. In any event, the shared-use data processing facility may then use diagnostic information pertaining to the failed sensor or device to autonomously request or to initiate needed maintenance for that failed sensor or device. In cases where a sensor does not provide automatic re-calibration capability, the shared-use data processing facility described herein may use redundant measurements, heat flow and material balances and/or process models to develop correction factors that may be applied to the measurements being read from inaccurate sensors and other devices, thereby eliminating the need to immediately remove, replace or service these devices. To facilitate the data correction capabilities of the shared-use data processing facility described herein, the various data servers used within the system such as, for example, the embedded servers 234, 235 and 242, the data concentration nodes 214 and 216 and the redundant servers 110-114, may add time stamp and data quality parameters to data that is being communicated between a plant and the shared-use data processing facility 100.

The shared-use data processing facility described herein may be used to cost effectively provide a wide variety of complex applications to a wide variety of customers, including large-scale geographically diverse plants owned by a single business entity, smaller single location industrial or commercial plants, and even small residential process systems (e.g., residential power and energy management applications). One particularly important industrial plant application of the shared-use data processing facility described herein involves the collection and reporting of continuous emissions monitoring data (CEMD). For example, the shared-use data processing facility described herein may compare CEMD from a particular plant (or plants) to predetermined operational or Environmental Protection Agency (EPA) limits and may generate one or more alerts, alarms and/or reports using the CEMD. In particular, if certain EPA emissions limits are exceeded (or are near a limit and are about to exceed that limit) an alert or alarm message may be automatically transmitted by the shared-use data processing facility to plant management, government authorities, etc. If desired, the alarm messages may be routed to cause the automatic dispatching of a maintenance person or any other person that may be able to investigate and/or correct the forecast or current condition causing the alarm. Such alarm messages may be conveyed using electronic mail messages, pager messaging, or any other desired messaging mechanism. Alternatively or additionally, the shared-use data processing facility described herein may transmit emissions data to plant management and/or government regulatory authorities using a pre-approved format. In any event, because the shared-use data processing facility can generate alarm messages indicating that an emissions limit is in danger of being exceeded and can send those messages to a plant manager or operator, the plant manager or operator may be able to avert a potentially costly violation of a governmental regulation.

In addition to providing alert or alarm messages in response to emissions levels that exceed or that are about to exceed regulatory limits, the shared-use data processing facility may also be used in an environmental management capacity, whereby the optimization applications of the shared-use data processing facility are used to minimize pollution levels (as opposed to merely alarming when such levels are near to or exceed regulatory limits). For example, CEMD may be used to provide inputs to a shared vector gradient, neural net, and/or Fibonacci search-based emissions optimization/minimization technique. Thus, the shared-use data processing facility described herein may be used to provide alarming functions, as well as control functions, including compensatory control or automatic safety shut down of a plant and optimization of plant processes, thereby minimizing environmental impact and improving plant safety and equipment integrity. More generally, such automatic or compensatory control functions may also serve to increase product production rates and quality, which may significantly increase plant profitability. Furthermore, because the shared-use data processing facility communicates using the Internet 122, plant owners and operators may provide ready on-line access to the operation of their plants to governmental authorities. In other words, government agents may be authorized to engage in on-line interrogation of a particular business entity's plant or plants, thereby eliminating costly and time consuming site visits.

Still further, the shared-use data processing facility described herein may provide cost accounting and management applications that enhance a plant operator's or plant owner's ability to manage and to control production or plant operation costs. In some cases, the shared-use data processing facility may be used to engage in real-time cost accounting and cost management activities that allow the operation of a plant to modify control parameters or any other plant conditions to maximize actual current profit, maximize actual current equipment utilization, etc. These cost accounting and cost management applications preferably, but not necessarily, provide intuitive cost information to plant managers or operators, instead of merely providing equipment information, which does not necessarily provide a clear understanding of the costs associated with that equipment information.

Generally speaking, compared to conventional systems, which typically utilize proprietary communication protocol and custom user interface software, the shared-use data processing facility described herein provides an increased scope of connectivity to process plants. The shared-use data processing facility described herein enables any authorized user to access needed plant information, analysis results, diagnostic information, emissions data, etc. using virtually any computer platform having internet browser capability and access to virtually any hardwired (e.g., telephone, cable, etc.) or wireless (e.g., satellite, cellular, etc.) communication link. Thus, plant managers, operators, regulatory agents or any other authorized users may be able to view real-time plant information associated with particular plants, areas within plants, particular systems or devices within a plant, etc. Furthermore, the shared-use data processing facility described herein may provide these users with a wide variety of environmental compliance reports, plant efficiency reports, energy usage reports, maintenance information, predictive results, etc. without requiring each plant to incur the overhead associated with having to support the complex hardware, software, software support personnel, training needs, etc. that is typically needed to carry out such activities. In other words, the shared-use data processing facility described herein enables a wide variety of information to be provided (i.e., served) to a wide variety of customers at a very low cost. For instance, a plant manager may use the shared-use data processing facility described herein to view and track in real-time, temperatures, pressures, flows, etc. via a corporate intranet connection to any computer (including a portable computer that is physically remote from the plant site) capable of executing a browser. Further, the plant manager may, if desired, trend one or more process parameters using a browser applet. Still further, a process engineer or plant manager may analyze and track batch process activities and, if desired, may request reports detailing a summary of raw material costs, energy costs, a comparison of product quality and costs between processing units, etc.

Thus, the shared-use data processing facility described herein may be used by small scale users that would not otherwise be able to justify the capital expenditures, specialized maintenance personnel, etc. that are typically required to maintain data processing facilities (i.e., the data acquisition systems, analyzers, communication systems, etc.) on-site at the plant. Instead, the shared-use data processing facility described herein enables multiple business entities to share a centrally-managed data processing facility via the Internet. In some cases, the shared-use data processing facility described herein may be owned and operated by one business entity and other different business entities having one or more process plants may lease (e.g., using an off-book operating lease, financial lease, etc.) or rent the data servers, software and any other equipment needed to use the shared-use data processing facility. In this manner, a business entity using the services of the shared-use data processing facility may be charged periodically for its use based on the amount and/or type of data being supplied to that business entity. Preferably, but not necessarily, the periodic charges incurred by the renting or leasing business entity would be substantially less than the costs that would otherwise be incurred by the business entity if it had to purchase and operate its own data processing facility of similar capability.

While the shared-use data processing facility has been described herein as preferably being implemented using one or more software applications, some or all of the functions carried out by these applications may be implemented in hardware, firmware, etc., and may be implemented by any other processor associated with a process control system or plant. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process control plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Furthermore, one or more different types of data storage devices may be used within the historians and other data storage equipment described in connection with the shared-use data processing system. For example, a redundant array of inexpensive disks (RAID) may be used if desired.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A data processing system for use with a process control system, the data processing system comprising:
    a first processing plant communicatively coupled to an open network;
    a second processing plant communicatively coupled to the open network;
    a primary server communicatively coupled to the open network, wherein the primary server is adapted to execute a data processing application; and
    a primary data historian communicatively coupled to the primary server, wherein the primary server is adapted to remotely receive first process control information originated by a device of the first processing plant via the open network and remotely receive second process control information originated by a device of the second processing plant via the open network and to store a portion of the received first and second process control information in the primary data historian and wherein the primary server is further adapted to use the data processing application to generate first analysis results specific to the first processing plant from the first process control information and send the first analysis results to the first processing plant via the open network and to use the data processing application to generate second analysis results specific to the second processing plant from the second process control information and send the second analysis results to the second processing plant via the open network.

2. The system of claim 1, further comprising a redundant server that is communicatively coupled to the primary server and the primary data historian, wherein the redundant server is adapted to maintain synchronization with the primary server and to supersede the primary server in response to one of a failure indication and degradation indication associated with the primary server.

3. The system of claim 2, further comprising a redundant data historian that is communicatively coupled to the primary server, the redundant server and the primary data historian, wherein the redundant data historian is adapted to maintain data synchronization with the primary data historian and to supersede the primary data historian in response to one of a failure indication and degradation indication of the primary data historian.

4. The system of claim 1, wherein the open network is the Internet.

5. The system of claim 1, wherein the first process plant is in a first geographic location and the second process plant is in a second geographic location different from the first geographic location.

6. The system of claim 1, wherein the first process plant is associated with a first business entity and the second process plant is associated with a second business entity.

7. The system of claim 1, wherein the data processing application is adapted to perform one of a plant optimization function, a real-time process monitoring function, a data reconciliation function, a plant emissions analysis function, a plant emissions control function, a dispatch function, a plant control function and an alarming function.

8. The system of claim 1, wherein the data processing application is adapted to perform a data correction function.

9. The system of claim 8, wherein the data correction function is one of a digital verification function, a data validation function, a data reconciliation function and a data source re-calibration function.

10. The system of claim 1, wherein the data processing application uses continuous emissions monitoring data to generate a plant emissions report.

11. The system of claim 10, wherein the data processing application generates the plant emissions report using a format defined by a governmental authority and communicates the plant emissions report to the governmental authority.

12. The system of claim 1, wherein the data processing application performs one of a plant emissions minimization and a plant emissions optimization using one of a shared vector gradient technique, a neural net technique and a Fibonacci search technique.

13. The system of claim 1, wherein the data processing application performs a compensatory control function in response to emissions data received from one of the first and second process plants.

14. The system of claim 1, wherein the data processing application uses an internet browser application as a visualization layer.

15. The system of claim 14, wherein the internet browser application is executed within a user interface that is physically remote from the first and second process plants.

16. The system of claim 1, wherein one of the first and second process plants further comprises one of an internet-enabled field device, an internet-enabled field device interface and a data concentration node.

17. The system of claim 16, wherein the one of the internet-enabled field device, an internet-enabled field device interface and a data concentration node includes an embedded data server and an embedded data historian communicatively coupled to the embedded data server.

18. The system of claim 1, wherein one of the first and second plants includes a digital communication network based on one of an RS485, Foundation Fieldbus, Ethernet TCP/IP and a wireless blue tooth protocol.

19. The system of claim 1, wherein one of the first and second plants and the primary server uses a data compression technique to transmit information via the open network.

20. The system of claim 1, wherein the second processing plant is disparate from the first processing plant.

21. The system of claim 1 wherein the first processing plant comprises first equipment necessary to carry out a first industrial process and the second processing plant comprises second equipment necessary to carry out a second industrial process.

22. A data processing system for use with a process control system, the data processing system comprising:
a cluster of redundant servers that are communicatively coupled via a local network, wherein each of the redundant servers is adapted to acquire and process data;
a plurality of redundant data historians that are communicatively coupled to each other and to the cluster of redundant servers; and
a plurality of process plants that are remotely and communicatively coupled to the cluster of redundant servers via an internet, wherein the plurality of process plants is associated with a plurality of business entities, and wherein the cluster of redundant servers is adapted to execute a data processing application that processes information originated by devices of the plurality of process plants and generates independent analysis results for each process plant from the information originated by the devices of that plant that are accessible by a user via the internet.

23. The system of claim 22, wherein the data processing application includes one of a data analysis tool, a remote process management tool, a process optimization tool, a continuous emissions monitoring and minimization tool, a distributed power management tool, a dispatch and optimization tool, a centralized multi-client HVAC system monitoring and maintenance management tool, a remote water and waste processing facility monitoring and control tool, a pharmaceutical process tool, a biotechnology process tool and a semiconductor process tool.

24. The system of claim 22, wherein each of the plurality of process plants includes one of an internet-enabled field device, an internet-enabled field device interface and a data concentration node.

25. The system of claim 24, wherein the one of the internet-enabled field device, an internet-enabled field device interface and a data concentration node includes an embedded data server and an embedded data historian.

26. A method of acquiring, analyzing and reporting process plant data, comprising the steps of:
remotely receiving information originated by devices of a plurality of disparate process plants associated with a plurality of business entities via an internet;
processing the remotely received information using a data processing application stored on one or more of a cluster of redundant servers associated with a vendor business entity that is different from the plurality of business entities to generate analysis results for each of the plurality of process plants;
storing the analysis results in a plurality of redundant data historians that are communicatively coupled to the cluster of redundant servers;
providing access to the analysis via the internet; and
billing each of the plurality of business entities based on one of respective data usage and type and processing time.

27. The method of claim 26, wherein the step of receiving the information from the plurality of process plants includes the step of receiving a first part of the information from a first process plant in a first geographic location and a second part of the information from a second process plant is in a second geographic location that is physically remote from the first geographic location, wherein the first process plant is associated with a first one of the plurality of business entities and the second process plant is associated with a second one of the plurality of business entities.

28. The method of claim 26, wherein the step of processing the received information includes the step of performing one of a plant optimization function, a real-time process monitoring function, a data reconciliation function, a plant emissions analysis function, a plant emissions control function, a dispatch function, a plant control function and an alarming function.

29. The method of claim 26, wherein the step of processing the received information using the cluster of redundant servers associated with the vendor business entity that is different from the plurality of business entities to generate the analysis results includes the step of performing a data correction function.

30. The method of claim 26, wherein the step of processing the received information using the cluster of redundant servers associated with the vendor business entity that is different from the plurality of business entities to generate the analysis results includes the step of using continuous emissions monitoring data to generate a plant emissions report.

31. The method of claim 30, wherein the step of using continuous emissions monitoring to generate the plant emissions report includes the step of using a format defined by a governmental authority.

32. The method of claim 26, wherein the step of processing the received information using the cluster of redundant servers associated with the vendor business entity that is different from the plurality of business entities to generate the analysis results includes the step of performing one of a plant emissions minimization and optimization using one of a shared vector gradient technique, a neural net technique and a Fibonacci search technique.

33. The method of claim 26, further comprising the step of sending a first part of the received information from one of the plurality of process plants to the cluster of redundant servers using one of an internet-enabled field device, an internet-enabled field device interface and a data concentration node.

34. The method of claim 33, wherein the step of sending the first part of the information from the one of the plurality of process plants to the cluster of redundant servers using the one of an internet-enabled field device, an internet-enabled field device interface and a data concentration node includes the step of using an embedded data server to send the first part of the information.

35. The method of claim 26, wherein the step of billing each of the plurality of business entities includes the step of billing each of the plurality of business entities in accordance with one of a rental agreement, an off-book operating lease agreement and a financial lease agreement for respective costs that are less than the costs associated with the costs that would otherwise be incurred by each of the plurality of processing plants to generate the analysis results.

36. The method of claim 26, wherein the analysis results include cost accounting information for each of the plurality of processing plants.

37. A data processing system for use with a process control system, the data processing system comprising:

a first processing plant communicatively coupled to an open network;

a second processing plant disparate from the first processing plant that is communicatively coupled to the open network;

a remote user interface communicatively coupled to the open network;

a server communicatively coupled to the open network, wherein the server is adapted to execute a data processing application; and a data historian communicatively coupled to the server, wherein the server is adapted to remotely receive first process control information originated by a device of the first processing plant via the open network and remotely receive second process control information originated by a device of the second processing plant via the open network and to store a portion of the received first and second process control information in the data historian and wherein the server is further adapted to use the data processing application to generate independent analysis results for each processing plant from the process control information originated by the devices of that processing plant and send the analysis results to the remote user interface via the open network.

38. The system of claim 37, wherein the remote user interface is associated with a regulatory authority.

39. The system of claim 38, wherein the regulatory authority is the Environmental Protection Agency.

40. The system of claim 37, further comprising a redundant server communicatively coupled to the server, wherein the redundant server is adapted to maintain synchronization with the server and to supersede the server in response to one of a failure indication and degradation indication associated with the server.

* * * * *